US008315657B2

(12) United States Patent
van Rensburg et al.

(10) Patent No.: US 8,315,657 B2
(45) Date of Patent: Nov. 20, 2012

(54) SYSTEM AND METHOD FOR ENABLING COORDINATED BEAM SWITCHING AND SCHEDULING

(75) Inventors: Cornelius van Rensburg, Wylie, TX (US); Patrick Ahamad Hosein, San Diego, CA (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 558 days.

(21) Appl. No.: 12/563,877

(22) Filed: Sep. 21, 2009

(65) Prior Publication Data

US 2010/0075705 A1 Mar. 25, 2010

Related U.S. Application Data

(60) Provisional application No. 61/099,094, filed on Sep. 22, 2008.

(51) Int. Cl.
*H04B 17/00* (2006.01)

(52) U.S. Cl. ............... 455/509; 455/67.11; 455/63.2; 455/63.3; 455/63.4; 455/447; 455/452; 455/56.1; 455/13.1; 455/562.1; 455/90.2

(58) Field of Classification Search ............... 455/90.2, 455/67.11, 509, 562.1, 422.1, 63.2–63.4, 455/447–452.2; 370/342, 335, 104.1, 75, 370/338, 352, 328
See application file for complete search history.

(56) References Cited

U.S. PATENT DOCUMENTS

| | | | | |
|---|---|---|---|---|
| 4,747,160 A | * | 5/1988 | Bossard | 455/422.1 |
| 5,239,671 A | * | 8/1993 | Linquist et al. | 340/7.26 |
| 5,550,809 A | * | 8/1996 | Bottomley et al. | 370/342 |
| 6,122,266 A | * | 9/2000 | Lynch | 370/335 |
| 6,229,796 B1 | * | 5/2001 | Dent | 370/335 |
| 6,359,874 B1 | * | 3/2002 | Dent | 370/342 |

(Continued)

FOREIGN PATENT DOCUMENTS

CN 1551519 12/2004

(Continued)

OTHER PUBLICATIONS

Huawei, "DL Coordinated Beam Switching for Interference management in LTE-Advanced," 3GPP TSG RAN WG1#54, R1-083236, Aug. 18-22, 2008, 6 pages, Jeju, Korea.

(Continued)

*Primary Examiner* — Matthew Anderson
*Assistant Examiner* — Ganiyu A Hanidu
(74) *Attorney, Agent, or Firm* — Slater & Matsil, L.L.P.

(57) ABSTRACT

A system and method for enabling coordinated beam switching and scheduling in a wireless communications system. A method for controller operation includes indicating that the controller is operating in a cooperative beam switching mode, transmitting a beam formed reference signal (BFRS), from each communications device being served by the controller, receiving a measurement of a communications channel between the controller and the communications device and an indicator indicating a transmission unit corresponding to the measurement of the communications channel, receiving a transmission intended for a communications device, and causing the transmission to be transmitted to the communications device. The BFRS is beam formed using a plurality of beam patterns, the beam pattern used in beam forming the BFRS changes once per transmission unit, and the transmission is transmitted using measurement of the communications channel and the indicator from the communications device.

22 Claims, 6 Drawing Sheets

U.S. PATENT DOCUMENTS

| | | |
|---|---|---|
| 7,274,330 B2 | 9/2007 | Lee |
| 7,274,936 B2 | 9/2007 | Zangi et al. |
| 7,373,176 B2 | 5/2008 | Chotkowski et al. |
| 8,041,313 B2 | 10/2011 | Van Rensburg et al. |
| 2004/0224637 A1 | 11/2004 | Silva et al. |
| 2005/0014540 A1 | 1/2005 | Shim |
| 2005/0070331 A1 | 3/2005 | Higuchi et al. |
| 2006/0203789 A1 | 9/2006 | Iacono et al. |
| 2007/0195908 A1* | 8/2007 | Attar et al. .............. 375/267 |
| 2008/0020715 A1 | 1/2008 | Zangi et al. |
| 2008/0075033 A1 | 3/2008 | Shattil |
| 2009/0147869 A1 | 6/2009 | Duan et al. |
| 2009/0253387 A1 | 10/2009 | Van Rensburg et al. |

FOREIGN PATENT DOCUMENTS

| | | |
|---|---|---|
| WO | WO2007/023515 | 3/2007 |

OTHER PUBLICATIONS

Nokia, "New UTRAN Measurement for RRM support of beamforming," 3GPP TSG RAN #21 meeting, Tdoc R1-01-0824, Aug. 27-31, 2001, 6 pages, Turin, Italy.

Thiele, L., et al., "Capacity Scaling of Multi-User MIMO with Limited Feedback in a Multi-Cell Environment," IEEE, 2007, 8 pages.

Written Opinion and International Search Report, International Application No. PCT/US09/57837, Applicant: Futurewei Technologies, Inc., Nov. 20, 2009, 6 pages.

European Search Report, Application No. 09815383.6-2411/2311192, Applicant: Huawei Technologies Co., Ltd., Jul. 20, 2011, 8 pages.

"3GPP TSG RAN WG1 Meeting #53bis—Proposals for LTE-Advanced Technologies," R1-082575, NTT DoCoMo, Inc., Warsaw, Poland, Jun. 30-Jul. 4, 2008, pp. 1-36.

"3GPP TSG RAN WGl#54—DL Coordinated Beam Switching for Interference management in LTE-Advanced," RI-083236, Huawei, Jeju, Korea, Aug. 18-22, 2008, 6 pgs.

Fujishima, K., et al., "Technical Proposal for IMT-Advanced, Rev-080009," 3GPP TSG RAN IMT-Advanced Workshop, Shenzhen, China, Apr. 7-8, 2008, pp. 1-23.

"3GPP TSG RAN WG1 Meeting #54—Inter-Cell Interference Mitigation Through Limited Coordination," RI-082886, Samsung, Jeju, Korea, Aug. 18-22, 2008, 9 pgs.

Saur, S., et al., "Grid-of-Beams (GoB) Based Downlink Multi-User MIMO," IEEE 802.16 Broadband Wireless Access Working Group, IEEE C802.16m-08/487, May 5, 2008, pp. 1-4.

"TSG-RAN WG1 #53bis—LTE-Advanced—Coordinated Multipoint transmission/reception," RI-082469, Ericsson, Warsaw, Poland, Jun. 30-Jul. 4, 2008, 6 pgs.

"3GPP TSG RAN WG1 Meeting #46—Schedule single vs. multiple beams per frame for E-UTRA," RI-062282, Ericsson, Tallin, Estonia, Aug. 28-Sep. 1, 2006, 5 pgs.

Baumgartner, T. et a., "Performance of Downlink Beam Switching for UMTS FDD in the Presence of Angular Spread," IEEE International Conference on Communications (ICC 2002), vol. 2, Aug. 2002, pp. 851-855.

Liao, W.J., et al., "A Novel Beam Switching Antenna Using RF Switches," IEEE Antennas and Propagation Society International Symposium, IEEE, Honolulu, HI, Jun. 9-15, 2007, pp. 5865-5868.

Love, D.J., "On the Probability of Error of Antenna-Subset Selection with Space-Time Block Codes," IEEE Transactions on Communications, vol. 53, No. 11, Nov. 2005, pp. 1799-1803.

Pedersen, K., et al., "Application and Performance of Downlink Beamforming Techniques in UMTS," IEEE Communications Magazine, vol. 41, No. 10, IEEE Communications Society, Oct. 2003, pp. 134-143.

Sanayei, S., et al., "Antenna Selection in MIMO Systems," IEEE Communications Magazine, vol. 42, No. 10, IEEE Communications Society, Oct. 2004, pp. 68-73.

Zeng, X.N., et al., "Performance Bounds for Space-Time Block Codes with Antenna Selection," International Symposium on Information Theory, ISIT Proceedings, IEEE, Chicago, IL, Jun. 27-Jul. 2, 2004, p. 339.

Hitachi, Ltd., "Interference Management for Broadband Transmission with Antenna Port 5," 3GPP TSG RAN WG1 #55bis, R1-090068, Ljubljana, Slovenia, Jan. 12-16, 2009, 3 pages.

Hosein, P., et al., "On the Performance of Downlink Beamforming with Synchronized Beam Cycles," IEEE, Huawei Technologies, Co., Ltd. 2009, 5 pages.

\* cited by examiner

SYSTEM AND METHOD FOR ENABLING COORDINATED BEAM SWITCHING AND SCHEDULING

This application claims the benefit of U.S. Provisional Application No. 61/099,094, filed on Sep. 22, 2008, entitled "Signaling Method to Enable Coordinated Beam Switching and Scheduling in an LTE Cellular System," which application is hereby incorporated herein by reference.

CROSS-REFERENCE TO RELATED APPLICATIONS

This application is related to the following co-assigned patent applications: Ser. No. 12/412,624, filed Mar. 27, 2009, entitled "System and Method for Wireless Communications;" Ser. No. 61/172,622, filed Apr. 24, 2009, entitled "System and Method for Allocating Beams in Time-Frequency Space Enabled Coordinate Beam Switching in a Wireless Communications System;" Ser. No. 61/173,404, filed Apr. 28, 2009, entitled "System and Method for Coordinating Electronic Devices in a Wireless Communications System;" and Ser. No. 12/534,271, filed Aug. 3, 2009, entitled "System and Method for Synchronized and Coordinated Beam Switching and Scheduling in a Wireless Communications System;" which applications are hereby incorporated herein by reference.

TECHNICAL FIELD

The present invention relates generally to wireless communications, and more particularly to a system and method for enabling coordinated beam switching and scheduling in a wireless communications system.

BACKGROUND

In general, wireless communications systems using beamforming make use of a number of transmit and/or receive antennas and signal processing to create fixed or adaptive transmit/receive beam patterns. The beam patterns may have a directional nature that may result in a performance improvement when compared with unidirectional transmit and/or receive antennas. The use of the beam patterns may yield a transmit/receive gain over wireless communications systems using unidirectional transmit and/or receive antennas.

As such, beamforming has been promoted as a promising technique to increase cell coverage and to improve cell edge spectral efficiencies. However, one main drawback of beamforming is the so called flashlight effect where the channel quality changes between user equipment (UE) measurement and reporting, and NodeB (NB) transmission, due to the changes in the beam pattern of the interfering neighbouring cells.

Other commonly used and typically interchangeable terms for UE may include mobile station, user, terminal, access terminal, subscriber, and so forth, while controller, base station, enhanced NodeB, base terminal station, and so on, may be commonly used terms for NB.

Coordinated beamforming/switching has been suggested as a possible solution to this problem (see C80216m-08_487, Alcatel_Lucent, "Grid-of-Beams (GoB) Based Downlink Multi-User MIMO", IEEE802.16m, May 2008; NTT DoCoMo, "Proposals for LTE-Advanced technologies", R1-082575, Warsaw, Poland, Jun. 30-Jul. 4, 2008; and co-assigned U.S. patent application Ser. No. 12/412,624, filed Mar. 27, 2009, entitled "System and Method for Wireless Communications").

During the development of Long Term Evolution (LTE), there was much discussion for the flexibility to customize LTE to maximize performance in specific environments. Also, during discussions of LTE-Advanced (LTE-A), many suggestions were made to manage interference level by using coordinated transmissions from different cells (see Ericsson, R1-082469, "LTE-Advanced—Coordinated Multipoint transmission/reception", Warsaw, Poland, Jun. 30-Jul. 4, 2008; Huawei, R1-083236, "Coordinated Beamforming for Interference management in Advanced E-UTRA", Jeju, Korea, Aug. 25-29, 2008; and co-assigned U.S. patent application Ser. No. 12/534,271, filed Aug. 3, 2009, entitled "System and Method for Synchronized and Coordinated Beam Switching and Scheduling in a Wireless Communications System"). It is well known that as cell size is decreased in an effort to improve spectral efficiency, interference increases.

SUMMARY OF THE INVENTION

These and other problems are generally solved or circumvented, and technical advantages are generally achieved, by embodiments of a system and method for dynamically assigning persistent resources in a wireless communications system.

In accordance with an embodiment, a method for controller operation is provided. The method includes indicating that the controller is operating in a cooperative beam switching mode, transmitting a beam formed reference signal (BFRS), receiving a measurement of a communications channel between the controller and a communications device and an indicator indicating a transmission unit corresponding to the measurement of the communications channel from each communications device being served by the controller, receiving a transmission intended for a communications device, and causing the transmission to be transmitted to the communications device, wherein the transmission is transmitted using measurement of the communications channel and the indicator from the communications device. The BFRS is beam formed using a plurality of beam patterns, and a beam pattern used in beam forming the BFRS changes once per transmission unit.

In accordance with another embodiment, a method for communications device operation is provided. The method includes measuring a communications channel between the communications device and a controller using a beam formed reference signal (BFRS) transmitted by the controller, selecting a communications channel measurement and an indicator indicating a transmission unit corresponding to the selected communications channel measurement, and transmitting the communications channel measurement and the indicator to the controller. The BFRS is beam formed using a plurality of beam patterns, and a beam pattern used in beam forming the BFRS changes once per transmission unit.

In accordance with another embodiment, a communications system is provided. The communications system includes a plurality of controllers, and a central controller coupled the plurality of controllers. An inuse subset of the controllers is wirelessly coupled to at least one communications device in a plurality of communications devices, and a subset of the plurality of controllers is operating in a cooperative beam switching mode (CBSM). Each of the controllers operating in the CBSM transmits a unique beam formed reference signal (BFRS). The BFRS is beam formed using a plurality of beam patterns, and a beam pattern used in beam forming the BFRS changes once per transmission unit. Each of the controllers operating in the CBSM also receives a measure of a communications channel between itself and communications devices it is serving. The central controller determines a period of the plurality of beam patterns for each controller.

An advantage of an embodiment is that UEs do not need to perform channel estimation on interfering cells. This may help to reduce computational overhead at the UEs. Additionally, this may help to reduce communications overhead since the UEs do not need to report channel estimates of interfering cells to their serving NB.

A further advantage of an embodiment is that UEs do not need to report preferred precoding matrix indications (PMI) or interferer preferred PMI to their serving NB. Again, this may help to reduce computational overhead at the UEs as well as communications overhead.

Yet another advantage of an embodiment is that the channel measurements made by the UEs provides a complete picture of the interference environment of the UEs, not only of the strongest interferer(s).

Yet another advantage of an embodiment is that the UEs do not need to know the configuration of their neighboring NBs. For example, in some wireless communications systems NBs may have different numbers of antennas and configurations, or some NBs may not participate in coordinated beam switching. The UEs are only concerned with a complete interference environment, not the details of the operation of the neighboring NBs. This may help reduce computational overhead at the UEs as well as communications overhead.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with NodeBs (NB) using beamforming to transmit to User Equipment (UE) using directional beam patterns, where the transmissions of the NBs may be synchronized with one another. The invention may be applied to wireless communications systems using a wide range of wireless access technologies, such as LTE, LTE-Advanced, and so forth. Additionally, the invention may also be applied to NBs using non-directional beam patterns.

Figure 1A:
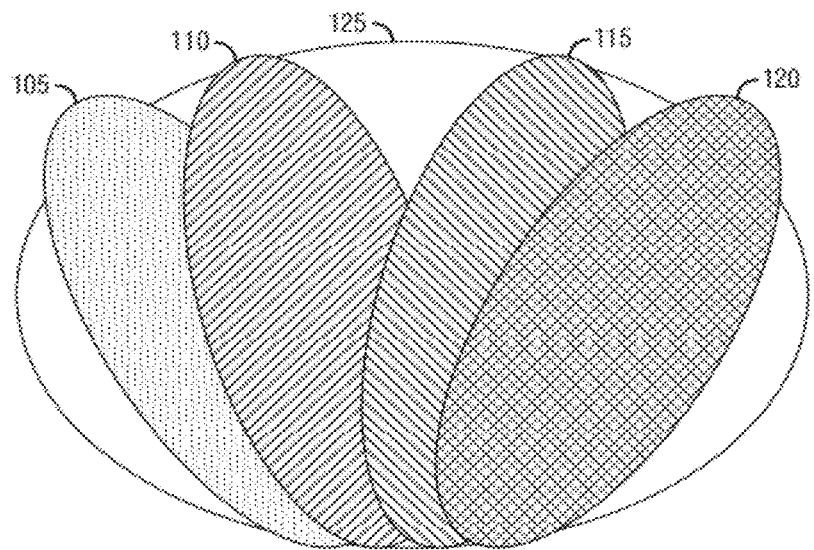
FIG. 1a is a diagram of possible antenna beams from a plurality of antennas.

FIG. 1a illustrates possible antenna beams from a plurality of antennas. As shown in FIG. 1a, there are four directional antenna beams, such as directional antenna beam "BEAM 1" 105, directional antenna beam "BEAM 2" 110, directional antenna beam "BEAM 3" 115, and directional antenna beam "BEAM 4" 120, corresponding to different transmission antennas. FIG. 1a also illustrates an omnidirectional beam 125 that may correspond to the use of all antennas in the plurality of antennas to transmit the signal to be transmitted.

Figure 1B:
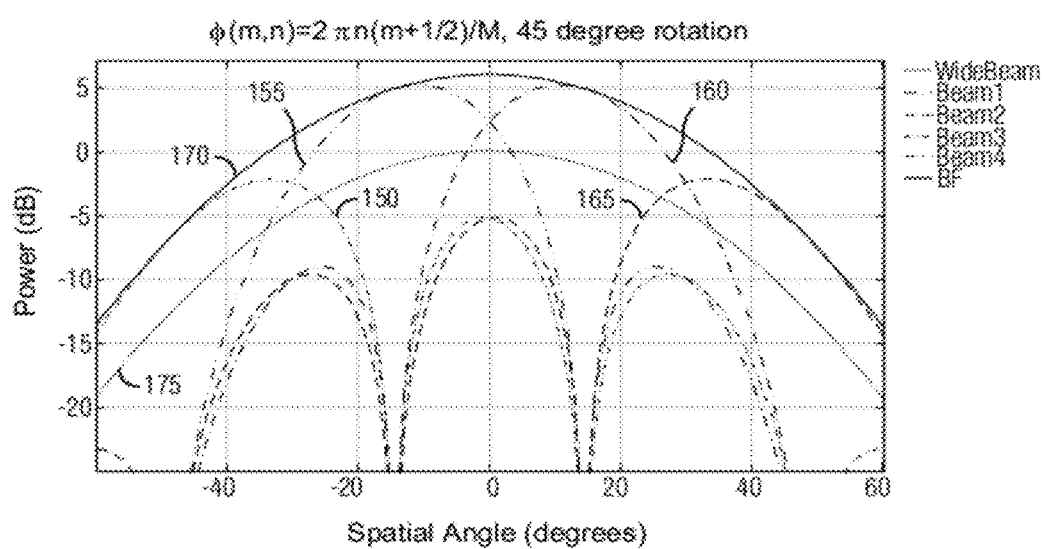
FIG. 1b is a diagram of beam patterns possible from four correlated antennas.

FIG. 1b illustrates beam patterns possible from four correlated antennas. Beams 150, 155, 160, and 165 illustrate individual beams from each one of the four correlated antennas. Beam 170 illustrates a widebeam beam pattern from the four correlated antennas and beam 175 illustrates a summation of the individual beam patterns from the four correlated antennas.

Cell coordination may happen at many levels. At the highest level, a central scheduler has full knowledge of all radio conditions of all UEs in a cluster of cells and tries to find a global optimum selection of UEs to be served at any instant in time. The use of a central scheduler would unfortunately require an excessive overhead on the backhaul, and may be simply impossible to implement considering the fundamental delays on the backhaul transmission. This necessitates the finding of a simpler, less optimal solution that would be easier to implement.

According to an embodiment, each NB participating in coordinated beam switching may continually transmit a cell specific reference sequence (RS), with the cell specific RS being beam formed using the NB's preferred set of beams. If a time slot is a basic transmission unit, then for each time slot, the NB may transmit the cell specific RS with the cell specific RS being beam formed by a beam in the NB's preferred set of beams. The beams in the NB's preferred set of beams may be spatially distributed throughout a sector so that over sufficient coverage of the sector is provided after the NB has cycled through its preferred set of beams. A cycle of a preferred set of beams may be referred to as a beam cycling pattern. The beam cycling pattern may have a period, referred to as a beam cycling pattern period.

The cell specific RS may be decoded by every UE operating within a cell of a single NB. The transmission of the cell specific RS may be periodic in nature, meaning that as the NB cycles through its preferred set of beams in a beam cycling pattern period, the NB will repeat the cycling of the preferred set of beams in the beam cycling pattern. If, for example, the beam cycling pattern has a period of ten (10), then in an eleventh transmission unit (subframe), the NB will transmit the cell specific RS beam formed with the same beam used to beam form the cell specific RS transmitted in a first transmission unit (subframe).

Since the cell specific RS is transmitted continually, a dedicated channel may be used. For example, in a LTE communications system, the NBs may transmit the cell specific RS on antenna port five (5). Alternatively, another antenna port, such as antenna port six (6), may be used to transmit the cell specific RS. Although multiple antennas may be used to transmit the cell specific RS, to a UE the cell specific RS may appear as if it was being transmitted by a single antenna.

The beam cycling pattern may be able to slowly change to meet changing traffic distributions, for example. It is also expected that the traffic distributions slowly change, on the order of seconds. The slowly changing traffic distribution may imply that a received signal plus interference to noise ratio (SINR) measured at a slow moving UE may fluctuate deterministically in time as the NBs transmit the RS beam formed by the NBs' preferred set of beams.

Given the slowly changing nature of the operating environment of the NBs and UEs, as well as the UEs' slow movements relative to the beam cycling pattern and beam cycling pattern period, channel quality indications (CQI), such as SINR, reported by the UEs to their respective serving NB may be valid at some known time in the future. This may enable to reduce coordination information exchanged between the UEs and their respective serving NBs and neighboring NBs, as well as between the NBs themselves.

This may be contrary to a current beam forming mode in a LTE communications system, where a UE specific RS may be transmitted on a physical downlink shared channel (PDSCH) only during data transmission. The UE specific RS may be transmitted on antenna port five (5) of a NB serving the UE.

Instead, according to an embodiment, antenna port five (5) or some other antenna port configuration may be used to transmit a common RS (the cell specific RS) over a specific period of a certain number of subframes (e.g., transmission units) where both the cell specific RS and the PDSCH use the same beam forming matrix. The use of the same beam forming matrix for both the cell specific RS and PDSCH may result in a predictable beam and interference at a UE.

The UEs may then measure the CQI of a communications channel between itself and its serving NB directly from the cell specific RS, there will be no ambiguity about the CQI measurement as is the case when a UE specific RS is used in the CQI measurement. Furthermore, it may be expected that some beams will lead to significantly better CQI measurements than others.

The UEs may then feedback the CQI measurements to their respective serving NBs. In order to reduce CQI information feedback overhead and to avoid feeding back bad CQIs (low values) only the best CQI (or the N best CQIs, where N is a positive integer value) and corresponding transmission unit (s) (subframe(S)) index(s) may be feedback to the serving NB. Due to the slowly changing nature of the traffic distribution, the amount of CQI feedback may be further reduced by increasing a period of the CQI feedback.

Figure 2A:
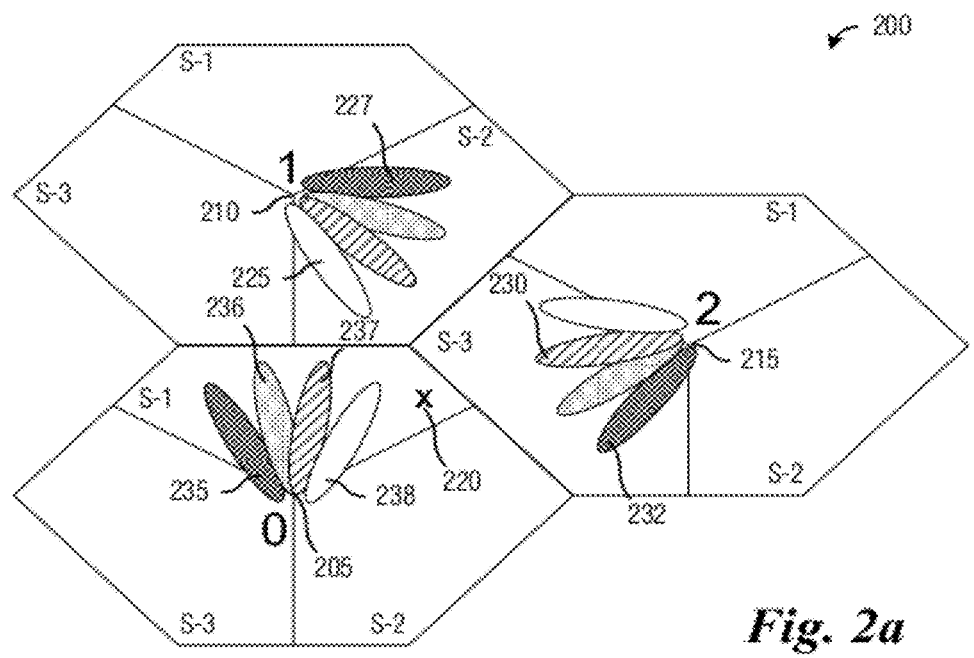
FIG. 2a is a diagram of a cluster of cells in a wireless communications system.

FIG. 2a illustrates a cluster of cells 200 in a wireless communications system. Cluster of cells 200 includes cell "0" 205, cell "1" 210, and cell "2" 215, with each cell in cluster of cells 200 being divided into three sectors, such as sector "S-1," sector "S-2," and sector "S-3." As shown in FIG. 2a, sector S-1 may only experience significant interference from sectors S-2 and S-3 of neighboring cells.

As shown in FIG. 2a, a cell, such as cell "0" 205 may have a preferred set of beams comprising four beams (beams 235-238). The beams may be spatially distributed so that an entirety of a sector, such as sector S-1, may be sufficiently covered by the preferred set of beams. However, since the beams are spatially distributed, CQI measurements made by a UE, such as UE 220, may be impacted by differing amounts. For example, UE 220 may measure a relatively small CQI when cell "0" 205 is transmitting the cell specific RS beam formed by beam 235, while UE 220 may measure correspondingly higher CQI when the cell specific RS is beam formed by beams 236 and 237. UE 220 may measure a maximum CQI when the cell specific RS is beam formed by beam 238.

Although each NB is shown in FIG. 2a as having four beams, each NB may have a different number of beams. Furthermore, even if each NB has the same number of beams, an order (beam cycling pattern) in which a NB cycles through its beams may differ between the NBs. Additionally, the beam cycling pattern period may also differ between NBs. Even with a different beam cycling pattern period for each of the NBs, there may be a global beam cycling pattern period for all NBs operating in the coordinated beam switching mode. For example, if a first NB uses a beam cycling pattern period of four (4), a second NB may use a beam cycling pattern for eight (8), and a third NB may use a beam cycling pattern period of two (2), then a global beam cycling pattern period of eight (8) or an integer multiple of eight (8).

Figure 2B:
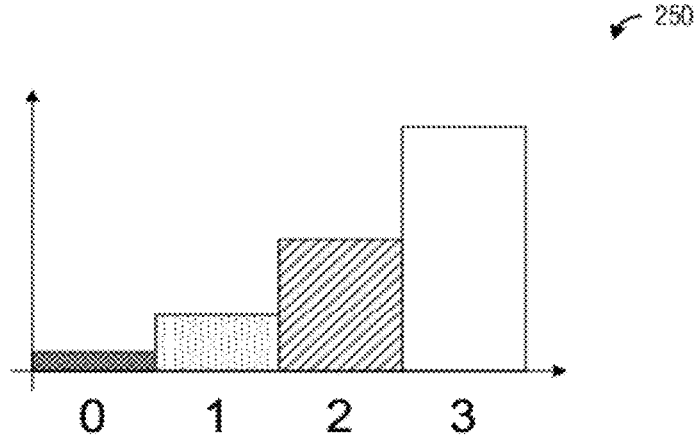
FIG. 2b is a diagram of a plot of CQI measurements made by a UE.

FIG. 2b illustrates a plot 250 of CQI measurements made by UE 220, wherein UE 220 is being served by cell "0" 205. Plot 250 shows that in transmission unit "0", UE 220 may measure a small CQI corresponding to the cell specific RS being beam formed by beam 235, and for transmission units "1" and "2", UE 220 may measure increasing CQIs as the spatially distributed beams direct more of the cell specific RS towards UE 220. In transmission unit "3," when cell specific RS beam formed by beam 238 is most directed at UE 220, UE 220 may measure the maximum CQI.

Although FIG. 2b illustrates that a UE measures the maximum CQI when the cell specific RS when it is most directed at the UE. In practice, the UE may actually measure a higher CQI when the cell specific RS is not most directed at the UE if a situation arises wherein when the cell specific RS is most directed at the UE, a neighboring NB is also transmitting its cell specific RS directly at the UE. In other words, the UE may not measure its maximum CQI when it is measuring a maximum received signal if it is also receiving a large amount of interference at the same time.

Referencing back to FIG. 2a, since UE 220 simply measures CQI for each transmission unit, UE 220 may also be measuring interference from neighboring NBs, such as cell "1" 210 and cell "2" 215. The combination of the measured signal from the serving NB (i.e., cell "0" 205) and interference from the neighboring NBs as measured by UE 220 may be referred to as the SINR measured by UE 220. As with the cell specific RS transmitted by cell "0" 205, the amount of interference caused by cell "1" 210 and cell "2" 215 may be dependent on the beam forming beam being used. For example, with cell "1" 210, when beam 225 is being used to beam form its cell specific RS, maximum interference may be observed at UE 220, while beam 227 may cause minimum interference. Similarly, for cell "2" 215, beam 230 may cause maximum interference and beam 232 may cause minimum interference to UE 220, respectively.

The impact of different beam patterns transmitted by a serving cell on the received signal strength level at a UE along with the interference at a UE caused by different beam patterns transmitted by neighboring cells, i.e., an overall SINR at the UE, may introduce interference fluctuations that may be used to schedule transmission to and from the UE to improve channel capacity in a wireless communications system.

Figure 3:
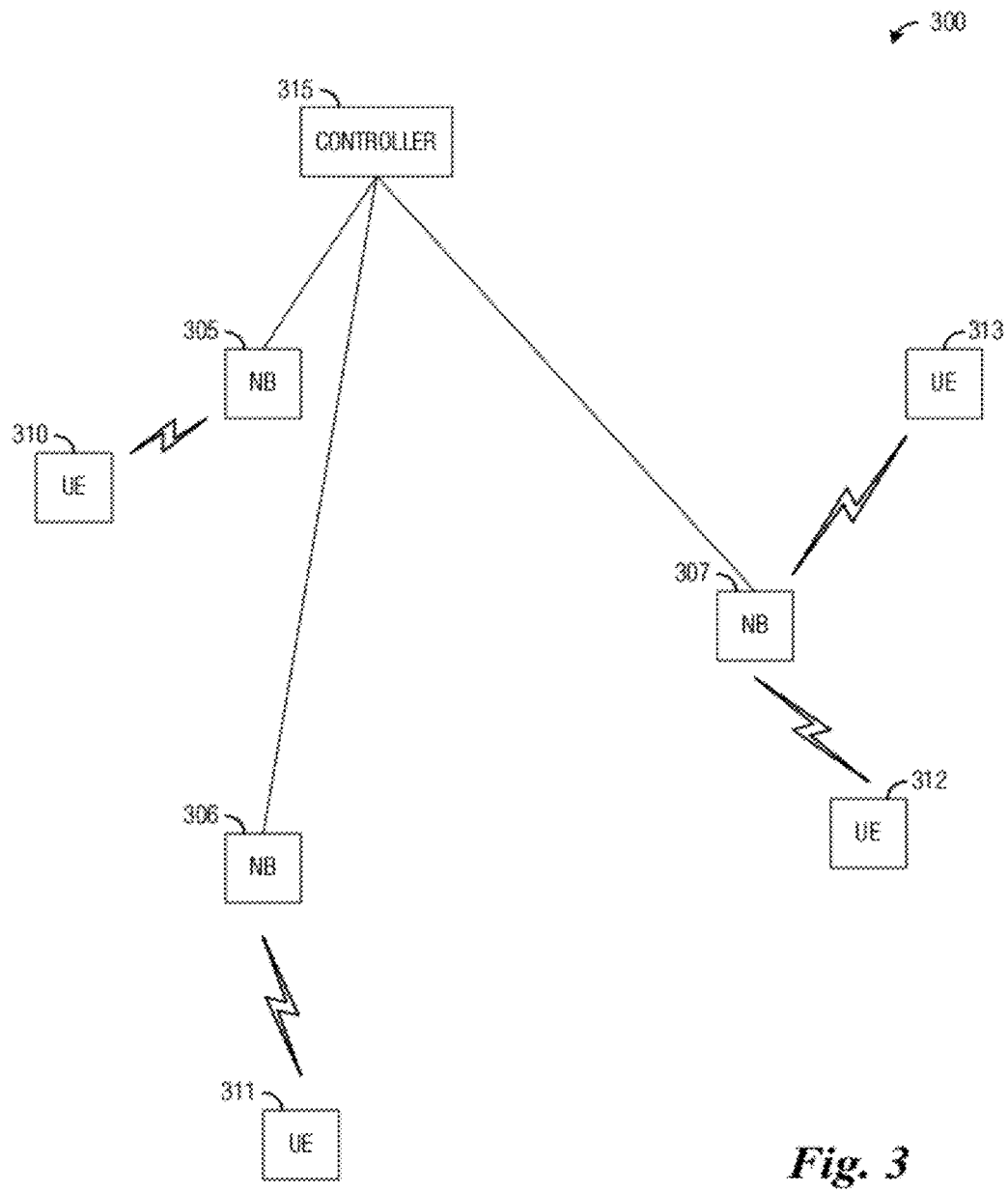
FIG. 3 is a diagram of a wireless communications system.

FIG. 3 illustrates a wireless communications system 300. Wireless communications system 300 includes a number of NBs, such as NB 305, NB 306, and NB 307. Each of the NBs may be responsible for allocating network resources to UEs, such as UE 310, UE 311, UE 312, and UE 313, that it is serving. For example, a NB may forward a transmission intended for a UE that it is serving or allocate some network resources to a UE that it is serving so that the UE may transmit information.

Some or all of the NBs in wireless communications system 300 may be operating in a coordinated beam switching mode. The NBs that are operating in a coordinated beam switching mode may each transmit cell specific RS beam formed with beams in a preferred set of beams. Each NB may have a different preferred set of beams. Each cell within a single NB may have a different preferred set of beams. Additionally, each NB or each cell may have a different number of beams in its preferred set of beams. Furthermore, a cycling pattern for each NB or each cell may be different in terms of period and/or pattern.

In a situation when not all of the NBs in wireless communications system 300 is operating in a coordinated beam switching mode, then if the NB has a neighboring NB that is not operating in a coordinated beam switching mode (for example, the neighboring NB may be operating in spatial multiplexing or transmit diversity modes), then the CQI measurements made by UEs of the NB may be impacted by transmissions made by the neighboring NB that occur at the same time and frequency as the cell specific RS transmitted by the NB.

Although each NB or each cell may have a beam cycling pattern with a different period, there may be a global beam cycling pattern period for all NBs operating in the coordinated beam switching mode. A controller 315 connected to the NBs may specify the global beam cycling pattern period based on individual beam cycling pattern periods from each of the NBs or cells. The global beam cycling pattern period may be a smallest multiple of all of the individual cycling pattern periods. For example, if three NBs are participating in the coordinated beam switching mode with individual beam cycling pattern periods of four (4), four (4), and eight (8), respectively, then the global beam cycling pattern period may be eight (8). Alternatively, the global beam cycling pattern period may be 16, 24, or so forth.

Alternatively, controller 315 may set its own global beam cycling pattern period independent of the individual beam cycling pattern periods.

In yet another alternative embodiment, the global beam cycling pattern period may be specified in a technical standard specification. Since the global beam cycling pattern period is specified in a technical standard specification, it may not be necessary for controller 315 to determine the global beam cycling pattern period, nor may it be necessary for the NBs to transmit their individual beam cycling pattern period to controller 315.

In yet another alternative embodiment, the beam cycling pattern periods of the individual NBs may also be specified in a technical standard specification. Since the individual beam cycling pattern periods are specified in a technical standard specification, it may not be necessary for controller 315 to determine the global beam cycling pattern period, nor may it be necessary for the NBs to transmit their individual beam cycling pattern period to controller 315.

Since the NBs participating in coordinated beam switching mode know the global beam cycling pattern period, the NBs do not need to know the specific beam cycling patterns or the preferred set of beams of the other NBs. The NBs may make use of the global beam cycling pattern period along with the CQI measurements from the UEs that it is serving to schedule transmissions and avoid interference.

Due to the slowly changing nature of the traffic distribution, controller 315 may communicate with the NBs in a relaxed manner. There may be no need to perform low latency, high priority communications. Therefore, Layer Three (L3) messages may be sufficient to exchange information (such as individual beam cycling pattern periods, global beam cycling pattern period, and so on) between controller 315 and the NBs.

Figures 4, 5A, 5B:
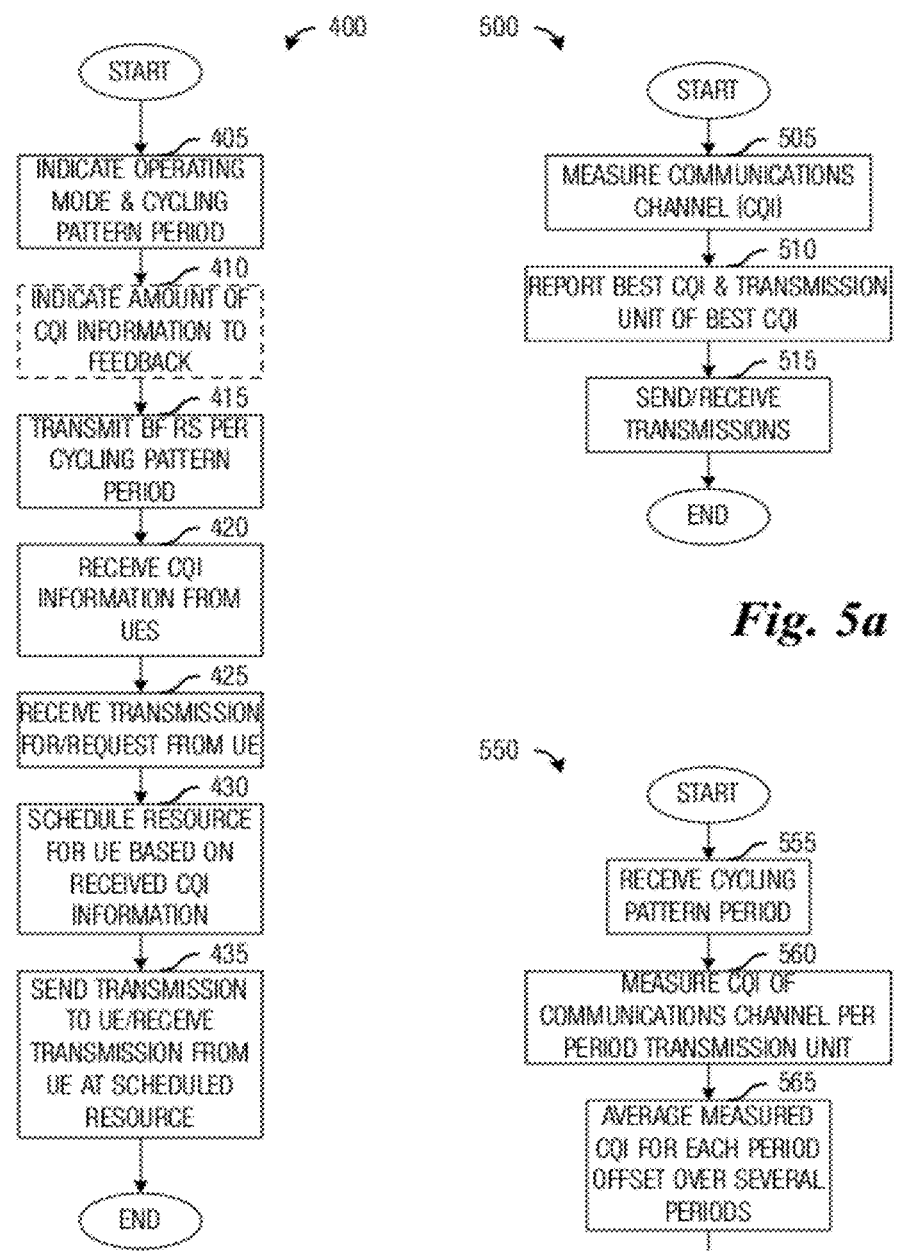
FIG. 4 is a flow diagram of NB operations in transmitting to a UE, wherein the NB and UE are operating in coordinated beam switching mode.
FIG. 5a is a flow diagram of UE operations in reporting channel information to a NB, wherein the UE and NB are operating in coordinated beam switching mode.
FIG. 5b is a flow diagram of UE operations in measuring CQI.

FIG. 4 illustrates a flow diagram of NB operations 400 in transmitting to a UE, wherein the NB and UE are operating in coordinated beam switching mode. NB operations 400 may be indicative of operations occurring in a NB, such as NB 205, as it receives a transmission intended for a UE, such as UE 220, that it is serving. NB operations 400 may also illustrate operations occurring when the NB periodically transmits information to inform UEs that it is serving as well as UEs that desire to become attached to the NB or newly attached to the NB, wherein the information includes the operating mode (i.e., coordinated beam switching mode), the NB's beam cycling pattern period, and so forth. NB operations 400 may continue as long as the NB continues to operate in coordinated beam switching mode.

NB operations 400 may begin with the NB transmitting (broadcasting) information such as operating mode and beam cycling pattern period to UEs operating within the NB's coverage area (block 405). The information includes the operating mode (i.e., coordinated beam switching mode), the NB's beam cycling pattern period, and so forth. As discussed previously, due to the slowly changing nature of the traffic distribution, it may be sufficient to periodically transmit (broadcast) the information, with the period being relatively long. Furthermore, a low latency, high priority message may not be required. Therefore, a good candidate for transmitting the information may be a L3 message.

The NB may also optionally transmit an indication of an amount of CQI information that it wishes each UE that it is serving to provide as feedback (block 410). Since the NB may be serving a large number of UEs, if every UE was to provide all of its CQI information, then the CQI feedback overhead may be very large. Therefore, the NB may indicate to the UEs that they may feedback only the highest measured CQI (along with an index indicating when the CQI was measured). For example, if for a UE, the highest measured CQI occurred in a fourth transmission unit (or subframe) of a period, then the UE may feedback the measured CQI value and a number four. If the UE measures several CQI with substantially the same value, then the UE may use historical information to select the index that has historically had the highest measured CQI value and report the measured CQI value and the index to the NB.

Alternatively, the NB may indicate to the UEs that they should report the N highest measured CQI values (along with their corresponding indices), where N is an integer value and may depend on factors such as the beam cycling pattern period, desired CQI feedback overhead, available network resources, and so on. By reporting the N highest measured CQI values, additional flexibility may be provided to the NB when it comes to meeting bandwidth requirements of the UEs. For example, if a UE requires so much bandwidth that transmissions during a single transmission unit (subframe) is insufficient to meet the UE's requirements, then the NB may allocate additional network resources from an additional transmission unit to the UE, wherein the additional transmission unit may be a transmission unit that has one of the N highest measured CQI values as indicated by the UE.

While the NB is operating in coordinated beam switching mode, it may continuously transmit a cell specific RS (also commonly referred to as a pilot) that is cyclically beam formed with beams from the NB's preferred set of beams (block 415). Preferably, in a LTE communications system, the NB may transmit the cell specific RS using antenna port five (5). Alternatively, the NB may use a specially dedicated antenna port to transmit the cell specific RS.

Periodically, the NB may receive feedback information from the UEs that it is serving (block 420). As discussed above, the feedback information comprises measured CQI value(s) and index(es) indicating where in the beam cycling pattern period the feedback CQI value(s) was measured. The amount of feedback information may be dependent on configuration information provided to the UEs as they attach to the NB and may be optionally changed by messages broadcast by the NB. Alternatively, the amount of feedback information may be set by communications system operator.

The information provided by the feedback information from the UEs may be used by the NB to allocate network resources to the UEs when a transmission for the UE is received by the NB or when the NB receives a transmission request from the UE.

The NB may then receive a transmission intended for a UE that it is serving or a transmission request from a UE that it is serving (block 425). The NB may make use of the measured CQI feedback information provided by the UE to determine a network resource(s) to allocate to the transmission (block 430). For example, if the NB receives a transmission for the UE, then the NB may select network resources during a transmission unit (subframe) that has been indicated by the UE as having the highest measured CQI value to allocate to the transmitting of the transmission to the UE. The amount of network resource(s) allocated to the UE may be dependent on factors such as the size of the transmission, the amount of available network resources, the amount of time that has expired since the UE has received a transmission or has transmitted, the priority of the transmission, the priority of the UE, and so forth. If the NB received a transmission request from the UE, then the NB may send an indication to the UE indicating the network resource(s) allocated to the UE.

The NB may then transmit to the UE at the allocated network resource(s) or receive a transmission from the UE at the allocated network resource(s) (block 435). NB operations 400 may then terminate.

FIG. 5*a* illustrates a flow diagram of UE operations 500 in reporting channel information to a NB, wherein the UE and NB are operating in coordinated beam switching mode. UE operations 500 may be indicative of operations occurring in a UE, such as UE 220, as it operates in coordinated beam switching mode with a NB, such as NB 205. UE operations 500 may continue as long as the UE continues to operate in coordinated beam switching mode.

UE operations 500 may begin with the UE measuring a communications channel between the UE and the NB serving the UE (block 505). The UE may measure the communications channel between the UE and the NB as specified by the NB or communications system configuration.

FIG. 5*b* illustrates a flow diagram of UE operations 550 in measuring CQI. UE operations 550 may be an implementation of block 505, measuring the communications channel between the UE and the NB of FIG. 5*a*. As discussed above, the UE may measure a SINR (or some other CQI) of the communications channel over each of multiple transmission units (subframes) of a beam cycling pattern period of the NB. The UE need not know about the presence of any interferer(s) or its configuration. The UE may receive a signal at its antenna over a single transmission unit for each of the multiple transmission units.

In order to measure the communications channel, the UE may need to know the beam cycling pattern period (block 555). As discussed previously, the NB may periodically transmit the beam cycling pattern period to UEs that it is serving. The UE may then make use of the beam cycling pattern period to make its measurement of the communications channel (block 560).

Since the beam forming used for each transmission unit in the beam cycling pattern period may be different, the UE may not average the SINR over the beam cycling pattern period. Instead, the UE may average SINR over several beam cycling pattern periods (block 565). For example, the UE may average the SINR for transmission unit one (1) over period one, period two, period three, and so forth. The UE may perform the averaging of the SINR over several beam cycling pattern periods for each of the transmission units. In an alternative embodiment, the UE may not perform any averaging of the SINR, but use its SINR measurements made over a single beam cycling pattern period.

Referring back to FIG. 5*a*, according to information provided by the NB, the UE may select the best SINR out of the SINR measurements and report the best SINR or some other CQI (along with an index indicating the best SINR's position in the beam cycle period) to the NB (block 510). Alternatively, the UE may select the N best SINRs out of the SINR measurements and report the N best SINRs (along with the indices indicating the locations of the N best SINRs) to the NB, where N is an integer value.

The UE may perform the SINR or some other CQI measurements and feedback the SINR periodically as specified by the NB or communications system configuration. If the UE has to perform the SINR measurements too often, then a significant amount of overhead may be dedicated to the SINR measurements and overall performance may be degraded. However, if the SINR measurements are not performed with sufficient regularity, then the traffic distribution may change enough so that the communications system is not operating as well as it could.

When the UE is not performing SINR measurements and feeding back the SINR information to the NB, the UE may be sending and receiving transmissions based on allocation of network resources made by the NB based on the SINR information provided by the UE (block 515). UE operations 500 may then terminate.

Numerical simulations were performed to evaluate the performance of coordinated beam switching. In the simulations each NB will beam form using a predefined beam cycling pattern. All cells have 4/8 correlated antennas and forming beams using a DFT precoder with resulting beam patterns (Beam1, Beam2, Beam3, Beam4) as shown in FIG. 1*b*. Comparisons of the system performance of coordinate beam switching will be made with a Baseline case of 1 transmit antenna as well as the case where each NB does beam switching in an uncoordinated way. The performance when the UE implements an MRC as well as an MMSE-IRC receiver is also examined. Table 1 summarizes simulation parameters and settings.

TABLE 1

System Simulation Settings

| | |
|---|---|
| Number (Tx, Rx) | (1/4/8, 2) |
| Antenna Separation (Wavelength) | (0.5, 0.5) |
| Channel Model | SCM (Urban Macro, 8 degree spread) |
| Scheduler | Proportional Fair |
| Users per Cell | 10 |
| Control Overhead | None |
| HARQ | None |
| Receiver Processing | MRC/MMSE-IRC |
| FFT size, Bandwidth | 1024, 10 MHz |
| STS Distance | 500 m |
| Link to System | Effective SNR/Mutual Information |
| Shadow Fading | 8 dB |
| Isolation | 12 dB |
| NB Tx Power | 40 W |
| Rank Adaptation | None - only Rank 1 transmissions |
| UE Speed | 3 km/h |

Table 2 provides simulation results.

TABLE 2

Simulation Results (All MRC)

| | Cell AVG | Cell Edge |
|---|---|---|
| Base 1 × 2 | 1.4274 | 0.0197 |
| Uncoordinated Beam Switch 4 × 2 | 1.7305 | 0.0534 |
| Coordinated Beam Switch 4 × 2 | 2.2567 | 0.0798 |
| Coord Gain over 1 × 2 | 58% | 304% |
| UnCoord Gain over 1 × 2 | 21% | 171% |

Figure 6A:
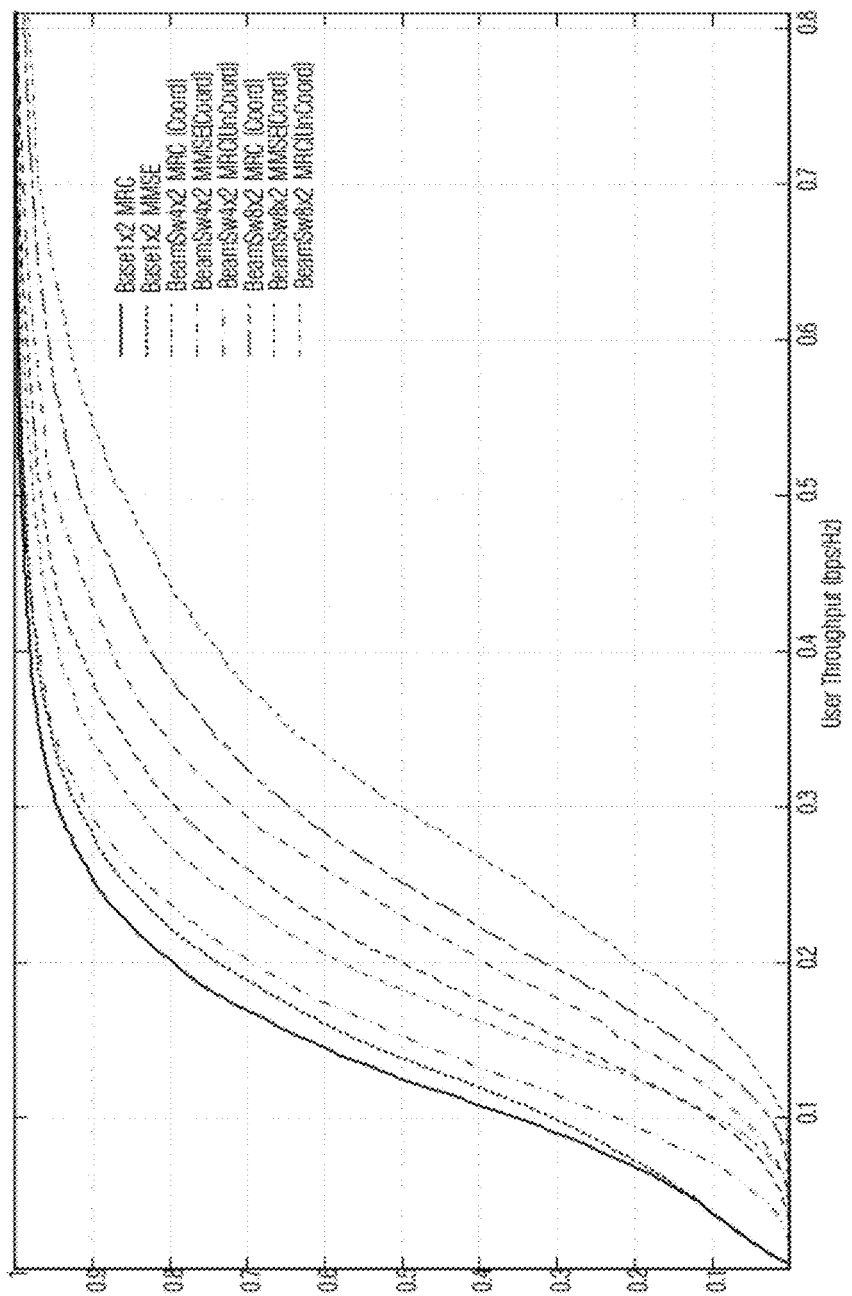
FIG. 6a is a data plot of a cumulative distribution function (CDF) of user throughput.
Figure 6B:
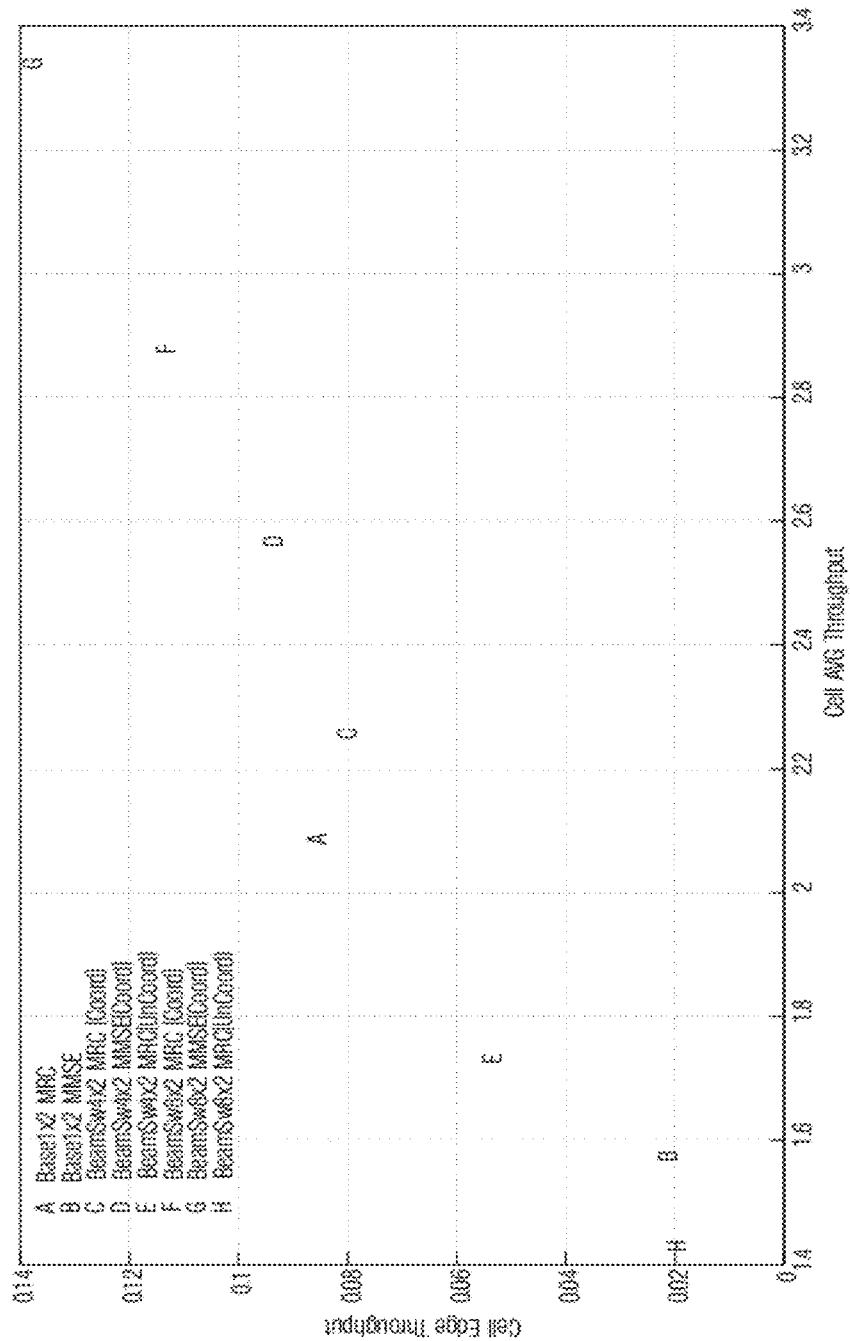
FIG. 6b illustrates a data plot of cell edge versus cell average spectral efficiencies.

FIG. 6a illustrates a data plot of a cumulative distribution function (CDF) of user throughput shown in Table 2. FIG. 6b illustrates a data plot of cell edge versus cell average spectral efficiencies. A significant improvement in cell average spectral efficiency is seen and very good improvements in cell edge spectral efficiency is also seen. This may be expected since coordinated beam switching focuses on interference management and therefore UEs with the most interference (the most interference limited users), the cell edge users, may receive the most gain. The performance gain with a MMSE-IRC receiver is more than with a MRC receiver. An explanation may be that a UE normally receives interference from two or three interferers, which with coordinated beam switching mode, it will typically see only one dominant interferer. Therefore, given than the MMSE-IRC receiver may have the most impact when there is only one dominant interferer, the MMSE-IRC receiver's performance improvement is not unexpected.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operation, the method comprising:
    indicating that the controller is operating in a cooperative beam switching mode with one or more other controllers;
    transmitting a beam formed reference signal (BFRS), wherein the BFRS is beam formed using a plurality of beam patterns, and wherein a beam pattern used in beam forming the BFRS changes once per transmission unit;
    receiving an indicator of a transmission unit having a highest quality measurement of a communications channel between the controller and a communications device, and receiving the measurement of the communications channel, from each communications device being served by the controller;
    receiving a transmission intended for a communications device; and
    causing the transmission to be transmitted to the communications device, wherein the transmission is transmitted using the measurement of the communications channel and the indicator from the communications device.

2. The method of claim 1, further comprising, transmitting a period of the plurality of beam patterns.

3. The method of claim 2, wherein there are multiple controllers operating in a communications system, and wherein the period is equal for each controller.

4. The method of claim 2, wherein indicating that the controller is operating in a cooperative beam switching mode and transmitting a period each comprises transmitting a layer three message.

5. The method of claim 1, further comprising, transmitting a number of measurements of a communications channel and indicators that each communications device is to send to the controller.

6. The method of claim 1, wherein the measurement of a communications channel comprises a maximum signal plus noise to interference ratio measurement of the communications channel made during a period of the plurality of beam patterns.

7. The method of claim 1, wherein the measurement of a communications channel comprises N largest signal plus noise to interference ratio measurement of the communications channel made during a period of the plurality of beam patterns, where N is a positive integer value.

8. The method of claim 1, wherein causing the transmission to be transmitted comprises:
    allocating a network resource during a transmission unit corresponding to the indicator; and
    transmitting the transmission at an occurrence of the allocated network resource.

9. The method of claim 1, wherein a transmission unit corresponding to the indicator does not have sufficient network resources to transmit an entirety of the transmission, and wherein causing the transmission to be transmitted comprises:
    allocating a first network resource during the transmission unit in a first period corresponding to the indicator to a first portion of the transmission;
    transmitting the first portion of the transmission at an occurrence of the allocated first network resource;

allocating a second network resource during the transmission unit in a second period corresponding to the indicator to a second portion of the transmission; and transmitting the second portion of the transmission at an occurrence of the allocated second network resource.

10. A method for communications device operation, the method comprising:

measuring a communications channel between the communications device and a controller for each beam pattern in a beam formed reference signal (BFRS) transmitted by the controller, wherein the BFRS is beam formed using a plurality of beam patterns, and wherein a beam pattern used in beam forming the BFRS changes once per transmission unit;

selecting a communications channel measurement having a highest quality value, and selecting an indicator indicating a transmission unit corresponding to the selected communications channel measurement; and transmitting the communications channel measurement and the indicator to the controller.

11. The method of claim 10, further comprising, receiving a number of transmission units in a period of the plurality of beam patterns from the controller.

12. The method of claim 10, wherein the BFRS is cyclically beam formed using the plurality of beam patterns, and wherein measuring a communications channel comprises measuring the communications channel for multiple cycles.

13. The method of claim 12, wherein measuring a communications channel further comprises:

averaging a communications channel measurement made during a first transmission unit in a first cycle with a communications channel measurement made during a second transmission unit in a second cycle, wherein the first transmission unit and the second transmission unit occur at a same time in the first cycle and the second cycle; and repeating the averaging for every transmission unit.

14. The method of claim 10, wherein selecting a communications channel measurement comprises, selecting a highest signal plus noise to interference ratio communications channel measurement.

15. The method of claim 14, wherein there are more than one communications channel measurement that are substantially equal, and wherein selecting a communications channel measurement comprises, selecting a communications channel measurement from the more than one communications channel measurement that are substantially equal with a history of higher signal plus noise to interference ratio communications channel measurements.

16. The method of claim 10, wherein selecting a communications channel measurement comprises selecting an N largest communications channel measurements, where N is a positive integer value.

17. The method of claim 10, wherein measuring a communications channel comprises, measuring a signal plus interference to noise ratio (SINR) of the communications channel over a transmission unit.

18. A communications system comprising:

a plurality of wireless controllers, wherein an in-use subset of the wireless controllers is wirelessly coupled to at least one communications device in a plurality of communications devices, wherein a subset of the plurality of wireless controllers is operating in a cooperative beam switching mode (CBSM), wherein each of the wireless controllers operating in the CBSM is configured to transmit a unique beam formed reference signal (BFRS), wherein the BFRS is beam formed using a plurality of beam patterns, and wherein a beam pattern used in beam forming the BFRS changes once per transmission unit, and configured to receive a maximum quality measurement of a communications channel, and an indicator of a transmission unit corresponding to the maximum quality measurement, from each of a plurality of communications devices it is serving; and a central controller coupled the plurality of wireless controllers, the central controller is configured to determine a period of the plurality of beam patterns for each wireless controller.

19. The communications system of claim 18, wherein each communications device operating in the CBSM measures the communications channel once per transmission unit.

20. The communications system of claim 18, wherein the maximum quality measurement is a maximum signal plus noise to interference ratio.

21. The communications system of claim 18, wherein each wireless controller operating in the CBSM is further configured to transmit a mode indicator indicating that it is operating in the CBSM.

22. The communications system of claim 18, wherein the unique BFRS is unique to each wireless controller operating in CBSM.

* * * * *